United States Patent [19]

Itou

[11] Patent Number: 5,251,864
[45] Date of Patent: Oct. 12, 1993

[54] SUSPENSION DEVICE FOR VEHICLE SEAT
[75] Inventor: Kenichi Itou, Akishima, Japan
[73] Assignee: Tachi-S Co., Ltd., Akishima, Japan
[21] Appl. No.: 871,395
[22] Filed: Apr. 21, 1992
[51] Int. Cl.⁵ ............................................. F16M 13/00
[52] U.S. Cl. ................................. 248/588; 297/344.12
[58] Field of Search ............... 248/588, 584, 564, 575; 267/173, 174, 175, 154; 297/301, 307, 345, 346; 108/145

[56] References Cited

U.S. PATENT DOCUMENTS

| | | | |
|---|---|---|---|
| 1,708,632 | 4/1929 | Podiebrad | 248/588 X |
| 4,640,488 | 2/1987 | Sakamoto | 108/145 |
| 4,673,170 | 6/1987 | Dykema | 267/174 |
| 4,880,201 | 11/1989 | Hall | 248/575 |
| 4,890,810 | 1/1990 | Sakamoto | 297/301 X |
| 4,941,641 | 7/1990 | Granzow | 248/588 |
| 5,014,960 | 5/1991 | Kimura | |

FOREIGN PATENT DOCUMENTS 63-7032  1/1988  Japan.
528858  12/1976  U.S.S.R. ............................. 248/588

Primary Examiner—J. Franklin Foss
Attorney, Agent, or Firm—Oldham, Oldham & Wilson Co.

[57] ABSTRACT

A suspension device for a vehicle seat, which comprises an upper frame, a lower frame, an X-shaped link interposed between the upper and lower frames, a vertically active elastic element for resiliently supporting the X-shaped link in the vertical direction, a slide frame, and a fore-and-aft active elastic element for resiliently supporting the slide frame in the forward and backward directions. The slide frame is connected with one end of the X-shaped link, so that the suspension device is not only active vertically for giving elasticity to the vertical motion of X-shaped link, but also active for allowing fore-and-aft resilient movement of the upper frame.

8 Claims, 3 Drawing Sheets

SUSPENSION DEVICE FOR VEHICLE SEAT

BACKGROUND OF INVENTION

1. Field of the Invention

The present invention relates to a suspension device for use in a vehicle seat such as an automotive seat, and in particular to a suspension device having a vertically active elastic element to resiliently support the seat in the vertical direction and a fore-and-aft active elastic element to resiliently support the same in the forward and backward directions.

2. Description of Prior Art

There has been known a suspension device of a vertically and fore-and-aft active type which permits a seat to be resiliently supported in the vertical direction as well as in the forward and backward directions. In general, this sort of suspension device comprises an upper frame, on which the seat is mounted, a lower frame fixed on a floor side of vehicle or automobile, an X-shaped link disposed between the upper and lower frames, a vertically active elastic element provided between the upper ends of the X-shaped link, and a fore-and-aft active elastic element disposed between the lower frame and the floor.

Typically, the vertically active elastic element gives a resilient force to normally bias the X-shaped link in a direction wherein the link is expanded to raise the upper frame, to thereby resiliently support the upper frame relative to the lower frame and absorb a vertical vibration or pitching of the seat, when the automobile is running on a rough road.

On the other hand, the fore-and-aft active elastic element, conventionally, uses a slide member to resiliently retain the lower frame in a given position, allowing the lower frame to be movable forwardly and backwardly to absorb a horizontal vibration or fore-and-aft rolling.

However, in such fore-and-aft active elastic element, the slide member is disposed laterally of the lower frame with a view to securing a wide space between the upper and lower frames, sufficient for the X-shaped link to be contracted at the lowest possible level. As a result, such slide member and associated parts are projected from the opposite sides of the lower frame to make greater the whole size of the suspension device, requiring thus a wide space in the cabin for installation thereof. Further, the slide member needs to be formed from a rigid material, as with the upper and lower frames, to support both suspension device and seat, which means to increase unexpectedly the weight and size of the slide member per se, rendering complicated its structure. Then, this particular conventional suspension device is disadvantageous in the assemblage, costs and the range of its applicability to small sized automobiles.

SUMMARY OF THE INVENTION

In view of the above-stated drawbacks, it is thus a first purpose of the present invention to provide an improved suspension device for a vehicle seat, which is much simplified structurally, avoiding an increase in dimensions and weight.

To achieve such purpose, according to the present invention, there is provided a suspension device which includes an upper frame, on which is mounted the seat, a lower frame fixed on a floor of the vehicle, a pair of X-shaped links interposed between those upper and lower frames, each of such pair of X-shaped links being essentially composed of a first link member and a second link member which are pivotally connected together, cross-wise, at their respective central pivot points, and a vertically active elastic means for resiliently acting on the X-shaped links to produce a vertical elasticity to the X-shaped links, wherein in those first and second link members, either one pair of ends of both first link members or one pair of ends of both second link members are pivotally fixed at one of the upper and lower frames, while all another ends of the upper and second link members are movably fitted in the corresponding upper and lower frames, wherein at least one of said upper and lower frames includes a pair of lateral frame sections each having a channel cross-section, wherein a slide means is interposed between and fitted in the lateral frame sections such as to be slidably movable in a longitudinal direction of one of the upper and lower frames, wherein on pair of such all another ends of said first and second link members are pivotally connected to the slide means, and wherein a fore-and-aft active elastic means is provided for resiliently acting on the slide means to give the same an elasticity forwardly and backwardly in that longitudinal direction of such one of upper and lower frames.

Accordingly, the slide means is simply fitted within one of the upper and lower frames, thus avoiding the need to provide the slide means outwardly or laterally of the frame as found in the prior art.

A second purpose of the invention is to provide a simplified structure in the fore-and-aft active elastic means, which effectively gives a proper elasticity to the forward and backward motion of the slide means, in addition to the foregoing vertically active elastic means which gives an elasticity to the vertical motion of the X-shaped links.

To this end, the slide means may preferably comprise a generally square-like slide frame whose both lateral frame sections are slidably fitted in the respective lateral frame sections of one of the upper and lower frames, and such both lateral frame sections of slide frame may be provided with rollers rollable within and along the longitudinal direction of those upper or lower frame's both lateral frame sections. Further, preferably, the fore-and-aft active elastic means may comprise a pair of first and second spring means which are connected with the slide frame, such that the first spring one acts to given an elasticity to the forward motion of the slide frame, while the second spring one does as such against the backward motion of the same slide frame.

DETAILED DESCRIPTION OF PREFERRED EMBODIMENT OF THE INVENTION

Figure 1:
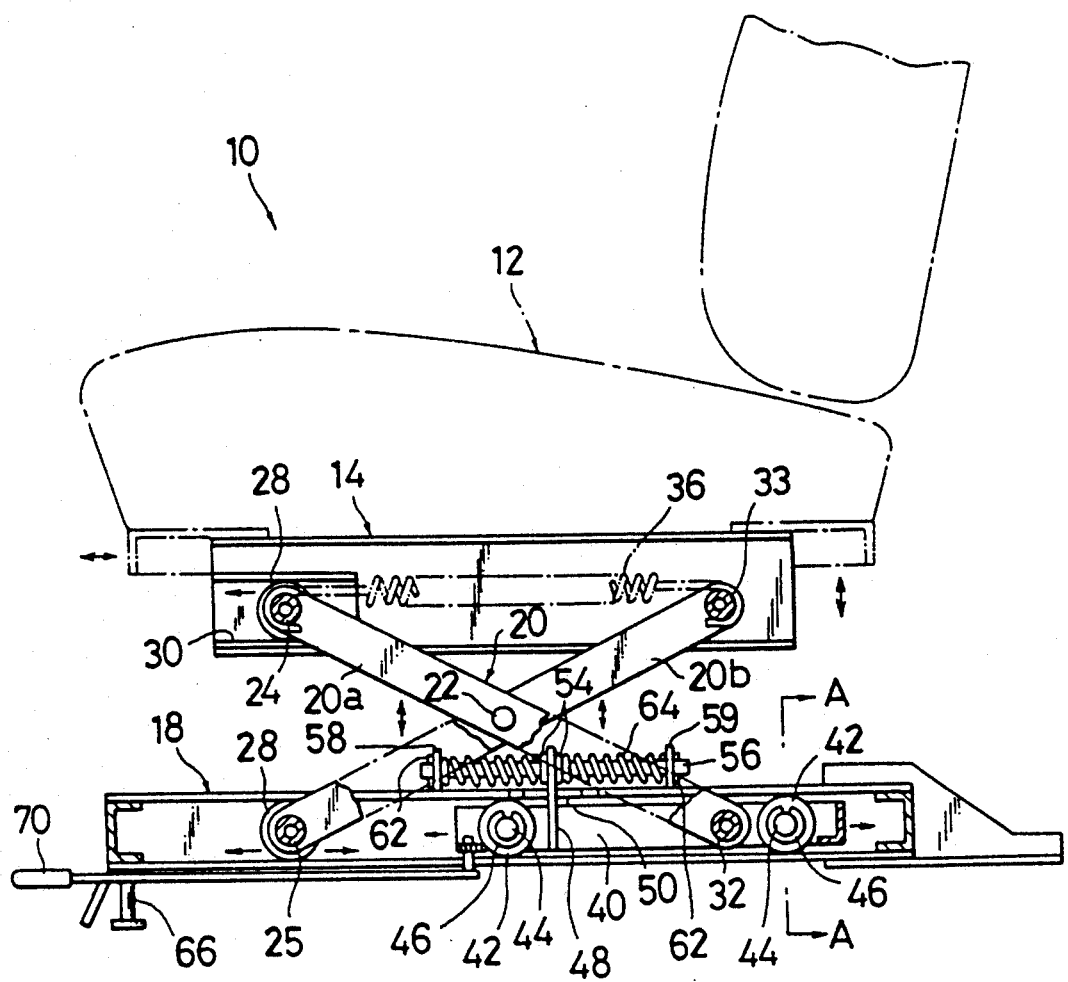
FIG. 1 is a schematic, longitudinally sectional view of a suspension device for a vehicle seat in accordance with the present invention.
Figure 2:
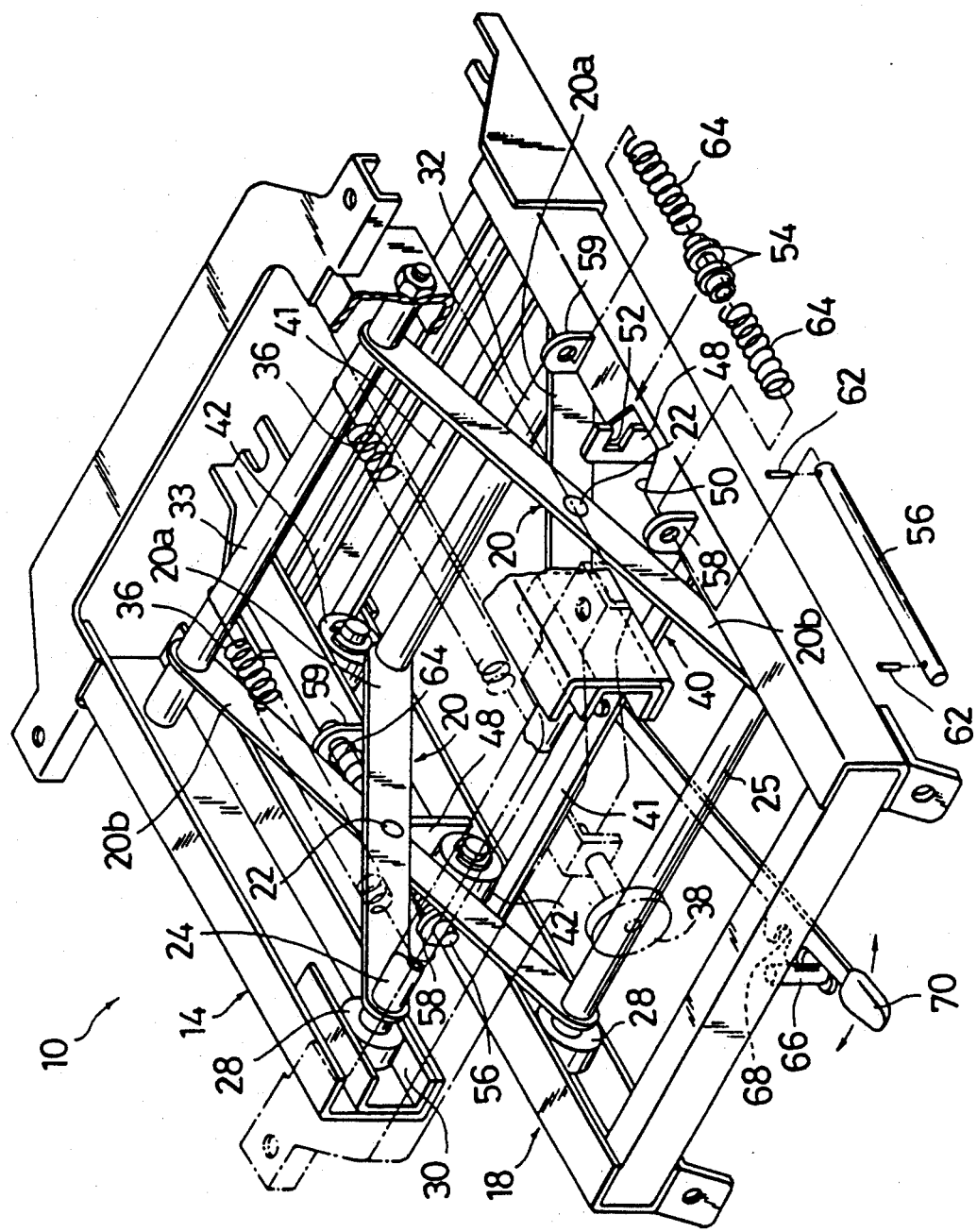
FIG. 2 is a partly broken, partly exploded, perspective view of the same suspension device as in the FIG. 1.

Referring to FIGS. 1 and 2, there is shown a suspension device (10) in accordance with the present invention, which is basically of the type wherein a pair of X-shaped links (20) are disposed between an upper frame (14) on which is mounted a seat (12) and a lower frame (18) which is fixed on a floor side of an automobile (not shown), in a manner allowing the upper frame (14) to be moved via the X-shaped links (20) away from and toward the lower frame (18).

The two X-shaped links (20) are each formed by two link members (20a)(20b) of the same length which are connected pivotally together at their central points, cross-wise, by means of a pin (22), such as to allow the link members (20a)(20b) to be contracted and expanded vertically. Each of those links (20) is disposed at the respective lateral sides between the upper and lower frames (14)(18), with one link member (20a) and another one (20b) being disposed outwardly and inwardly of the frames (14,18), respectively as shown.

Roughly viewing FIGS. 1 and 2 provides an understanding that the two X-shaped links (20)(20) are pivotally fixed at their respective rearward link member sides, while being movable at their respective forward link member sides along the longitudinal directions of upper and lower frames (14)(18). More specifically stated, the forward upper ends of inward link members (20a)(20a) are pivotally, rotatably connected to an upper forward connecting rod (24) which extends between both lateral frame sections of upper frame (14), whereas the rearward upper ends of outward link members (20b)(20b) are pivotally, rotatably connected to an upper rearward connecting rod (33) which extends between both lateral frame sections of upper frame (14). As shown, the upper forward connecting rod (24) is provided at its both ends with a roller (28) which is free to be rolled in the roller guide (30), and by contrast, the upper rearward connecting rod (33) is fixed at its both ends to the respective lateral frame sections of upper frame (14). In this respect, the roller guides (30) are shown as being fixed inwardly of and at the forward end portions of lateral frame sections of upper frame (14), respectively.

The forward lower ends of outward link members (20b)(20b) are pivotally, rotatably connected to a lower forward connecting rod (25). The lower forward connecting rod (25) is provided at its both ends with a roller (28), likewise in the one (28) associated with the upper forward connecting rod (24), but the rollers (28) at this particular connecting rod (25) are disposed in the opened, recessed part of lower frame (18) having a channel cross-section, thus being free to roll along the respective lower-frame lateral sections in the longitudinal direction thereof.

The rearward lower ends of inward link members (20a)(20a) are pivotally, rotatably connected to a lower rearward connecting rod (32) which extends in a slide frame (40) disposed slidably within the lower frame (18), which will be described in details later.

Attached over and between the upper forward and rearward connecting rods (24)(33) are a pair of coil springs (36) which resiliently expand the X-shaped links (20) in the vertical direction, as in known manner, thereby normally biasing the upper frame (14) in the upward direction and thus functioning as a vertically active elastic means to resiliently support the seat (12) in the upward and downward directions, as indicated by the arrow in FIG. 1.

Designation (38) in FIG. 2 denotes an operation handle for adjusting the tension of the foregoing pair of coils springs (36) so as to adjust the vertical cushiony degree of the suspension device.

Figure 3:
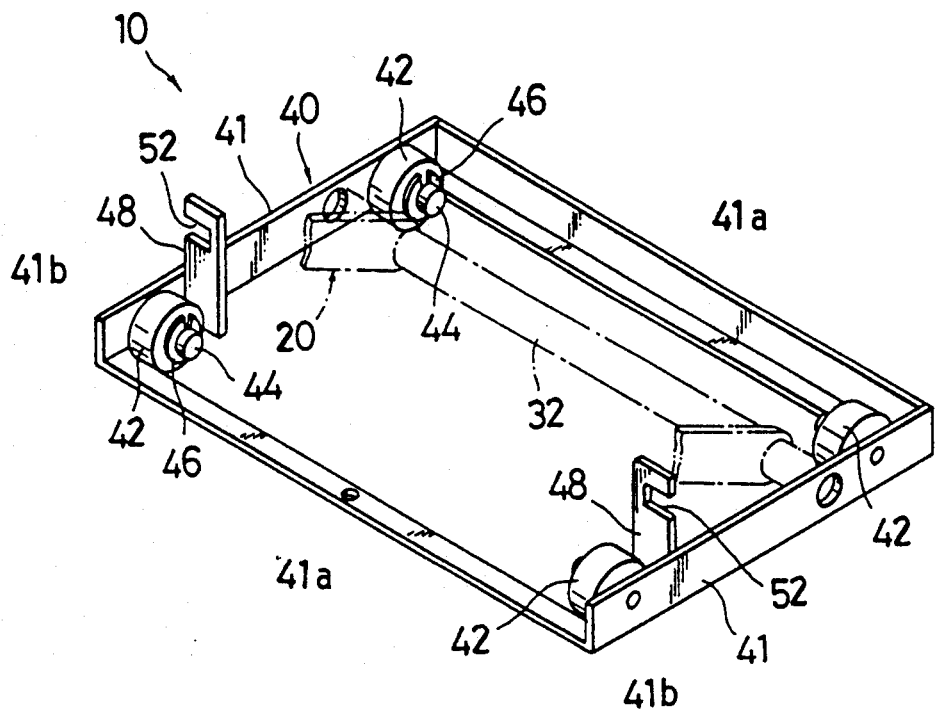
FIG. 3 is a schematic perspective view of a slide frame in the suspension device.
Figure 4:
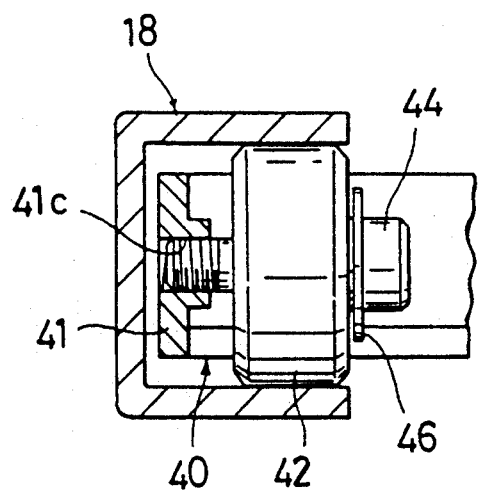
FIG. 4 is a sectional view taken along the line A—A in the FIG. 1.

Referring next to FIG. 3 which shows the slide frame (40) formed in a square shape, comprising a pair of forward and rearward frame sections (41a)(41a) and a pair of lateral frame sections (41b)(41b). In such slide frame (40), four rollers are arranged such that they are each disposed near the respective four corners of slide frame (40), and as best shown in FIG. 4, each of the rollers (42) is rotatably supported on a pin (44) which is threadedly fixed in the internally threaded hole (41c) formed in the lateral frame section (41b). Numeral (46) indicates a securing ring (46) for preventing the the roller (42) from falling off from the pin (44). Further, a pair of support members (48)(48) are fixed to the opposed inner walls of lateral frame section (41), respectively, such that the support members (48)(48) are disposed at the forward areas of lateral frame sections (40)(40) adjacent to the forward pair of rollers (42)(42), as seen from FIG. 3. Each of the support members (48) is made of a steel plate member, having a cut-away part (52) formed in its upper portion, with its opening oriented outwardly of the lateral frame section (41b).

Also in the slide frame (40), as can be seen from FIGS. 1 and 3, the lower rearward connecting rod (32) is disposed at the opposite side to the above-arranged support members (48); namely, the rod (32) extends between the two lateral frame sections (41b) and are fixed at the rearward areas of lateral frame sections (40), respectively, adjacent to the rearward pair of rollers (42)(42). As shown, the slide frame (40) is movably fitted in the lower frame (40) such that both lateral frame sections (41b)(41b) of slide frame (40) are respectively disposed in the channel cross-sections of lateral frame sections of lower frame (18), with the rollers (42) being also disposed in the respective channel cross-sections of lower-frame lateral frame sections in contact therewith. Thus, the slide frame (40) is free to move along the longitudinal direction of lower frame (18) via the rollers (42), as indicated by the arrows in FIG. 1.

As seen from FIGS. 1 and 2, formed substantially at the central points in the respective upper horizontal portions of lower frame (18), are a pair of opposed cut-away areas (50) in an elongated notch manner. In those areas (50), the upper portions of foregoing support members (48) are respectively disposed, projecting their upper portions above the respective areas (50), so that the cut-away parts (52) there are exposed above the lateral frame sections of lower frame (18). In this regard, on the other hand, each of the lower-frame lateral frame sections is formed with a pair of first and second brackets (58)(59), each being disposed a certain distance from each other and on the opposite sides of above-stated cut-away part (52). Further, each of the brackets (58)(59) is formed with a hole, and it is arranged that those holes and cut-away parts (52) are aligned coaxially with one another. A bush member (54) is fitted in each of cut-away portions (52) against axial movement, and a rod (56) passes through those holes and movably through the bush member (54). The rod (56) is securely mounted between the brackets (58)(59) by means of pins (62)(62). A coil spring (64) is wound about the rod (56) between the first bracket (58) and bush member (54), and another coil spring (64) is wound about the same rod (56) between the second bracket (58) and bush member (54), as best shown in FIG. 1. With this arrangement, as in FIG. 1, the support member (48) is resiliently retained midway between the first and second brackets (58)(59) as well as midway in the cut-away portion (50), whereby the lower rearward ends of both two inward link members (20a)(20a) are allowed to move along the lower frame (18), while being urged in a direction to the midway point in the cut-away portion (50) of lower frame (18), thereby providing a cushiony effect to the seat (12) in the forward and backward directions as indicated by the arrows in FIG. 1. It is noted here that both edges of the cut-away portion (50) serves as forward and backward limits against the support member (52). In that sense, those slide frame (40), coil springs (64), brackets (58)(59), rod (56) and cut-away portion (50) function as a good example of fore-and-fore active elastic means in the device (10).

Accordingly, it is to be appreciated that the slide frame (40) is disposed inwardly of the lower frame (18) and further stored within the height-wise thickness of the same lower frame (18) as can be seen in FIG. 4, which eliminates the previously stated prior-art problem that the slide frame needs to be disposed on both lateral sides of lower frame, and at the same time simplifies the structure of the slide frame, without requiring some special peripheral support or mechanic elements therefor. Thus, all the problems raised in the prior, say, weight and dimensional increases, are solved by the above-constructed suspension device (10) of the present invention. What is more, the slide frame (40) per se is arranged in the state avoiding its interference with the vertically expanding and contracting motions of the X-shaped links (20).

Designation (70) denotes a lock lever for locking the slide frame (40) against fore-and-aft movement or unlocking same from the locked state. The lock lever (70) is connected, at its rear end portion, pivotally to the forward frame section (41a) of slide frame (40), such as to be rotatable about the pivot point on that slide frame section (41) in the width-wise direction of both slide and lower frames (40) (18). Also, the forward end portion of same lock lever (70) is formed with plural hook-like engagement portions to be selectively engaged with a lock rod (66) fixed on the floor of automobile. Hence, operating the lock lever may cause the slide frame (40) to be locked at a desired point, thus permitting adjustment in tension of either first or second coil spring (64)(64) to thereby adjust the cushiony degree of the seat (12) in the forward and backward directions according to the tastes of an occupant on the seat.

While having described the present invention as above, it should be finally understood that the invention is not limited to the illustrated embodiment, but any other modifications, replacements and additions may structurally be possible to the invention without departing from the spirit and scope of the appended claims. For example, instead of providing the pair of coil springs (64)(64) on both lateral frame sections of lower frame (18), they may only be provided in a single pair form upon one of those lower-frame lateral sections. Further, the slide frame (40) may be disposed in the upper frame (14), instead of the illustrated embodiment, in the same connecting arrangements.

What is claimed is:

1. A suspension device for a vehicle seat, which includes an upper frame, on which is mounted said seat, a lower frame fixed on a floor of the vehicle, a pair of X-shaped links interposed between said upper and lower frames, each of said pair of X-shaped links being essentially composed of a first link member and a second link member which are pivotally connected together, cross-wise, at their respective central pivot points, and a vertically active elastic means for resiliently acting on said X-shaped links to produce a vertical elasticity to said pair of X-shaped links, wherein in said first and second link members, either one pair of ends of both first link members or one pair of ends of both second link members are pivotally fixed at one of said upper and lower frames, while all other ends of said first and second link members are movably fitted in the corresponding upper and lower frames, wherein at least one of said upper and lower frames includes a pair of lateral frame sections each having a channel cross-section, wherein a slide frame is interposed and movably fitted in said lateral frame sections, such that both lateral frame sections of said slide frame are fitted within the respective lateral frame sections, and provided with at least one pair of rollers which are free to roll in said respective lateral frame sections of said at least one of said upper and lower frames, thereby allowing said slide frame to be movable along a longitudinal direction of one of said upper and lower frames, wherein one pair of said all another ends of said first and second link members are pivotally connected to said slide frame, and wherein said lateral frame section of said one of said upper and lower frames is formed with a cut-away portion, wherein said slide frame has, provided at said lateral frame section thereof, a support plate whose one end extends through said cut-away portion to project above said one of said upper and lower frames, wherein there is provided a fore-and-aft active elastic means for resiliently acting on said slide frame to give the same an elasticity forwardly and backwardly in said longitudinal direction of said one of said upper and lower frames, said fore-and-aft active elastic means comprising a pair of first and second spring means and a rod fixed on said lateral frame section associated with said one of said upper and lower frames, wherein one end of said support plate is slidably connected to said rod, with such an arrangement that said first and second spring means are so attached around said rod that they are disposed symmetrically relative to said one end of said support plate, whereby said first spring means acts to give an elasticity to a forward movement of said slide frame, while said second spring means acts to give an elasticity to a backward movement of said slide frame, thereby urging said slide frame in the forward and backward directions.

2. The device as claimed in claim 1, wherein said all another ends of said first and second link members are movable in the corresponding upper and lower frames by means of rollers.

3. The device as claimed in claim 1, wherein said slide means comprises a generally square-like slide frame whose both lateral frame sections are fitted within the respective lateral frame sections of said at least one of said upper and lower frames, wherein each of said both lateral frame sections of said slide frame is provided with at least a pair of rollers which are free to roll in said respective lateral frame sections of said at least one of said upper and lower frames, so that said slide frame is movable along the longitudinal direction of said one of said upper and lower frames, and wherein a connecting rod extends between said one pair of said all another ends of said first and second link members and said connecting rod is further fixed at its both ends to the respective said both lateral frame sections of said slide frame, such that said one pair of said all another ends of said first and second link members are rotatably connected to said connecting rod.

4. The device as claimed in claim 1, wherein a lock lever is provided to lock and unlock said slide frame, and wherein said lock lever includes a stopper rod and plural hook-like engagement portions to be selectively engaged with said stopper rod.

5. The device as claimed in claim 1 wherein said slide frame is shaped in a generally square configuration.

6. The device as claimed in claim 5, wherein a pair of cut-away portions are formed in said both lateral frame sections of said one of said upper and lower frames, wherein said slide frame has, provided at said both lateral frame sections thereof, a pair of support plates, respectively, said pair of support plates each having one end which extends through the respective said pair of cut-away portions to project above said one of said supper and lower frame, wherein said fore-and-aft active elastic means further includes a pair of rods each being fixed on the respective said both lateral frame sections associated with said one of said upper and lower frames, and a pair of bush means which are respectively mounted on said pair of rods such as to be movable in a longitudinal direction of said rods, wherein said pair of first and second spring means are respectively attached about said pair of rods, with said pair of bush means being disposed between said pair of first and second spring means, respectively, and wherein said one ends respectively of said support plates are connected to each of said pair of bush means, so that said slide frame is to be urged bilaterally by means of said pair of first and second spring means, forwardly and backwardly.

7. The device as claimed in claim 4, wherein said fore-and-aft active elastic means includes a bush means which is mounted on said rod such as to slidingly movable in a longitudinal direction thereof, and disposed between said first and second spring means, wherein connected to said bush means is said one end of said support plate.

8. The device as claimed in claim 7, wherein said first and second spring means each comprises a coil spring and said bush means comprises a cylindrical bush member.

* * * * *